Patented June 7, 1938

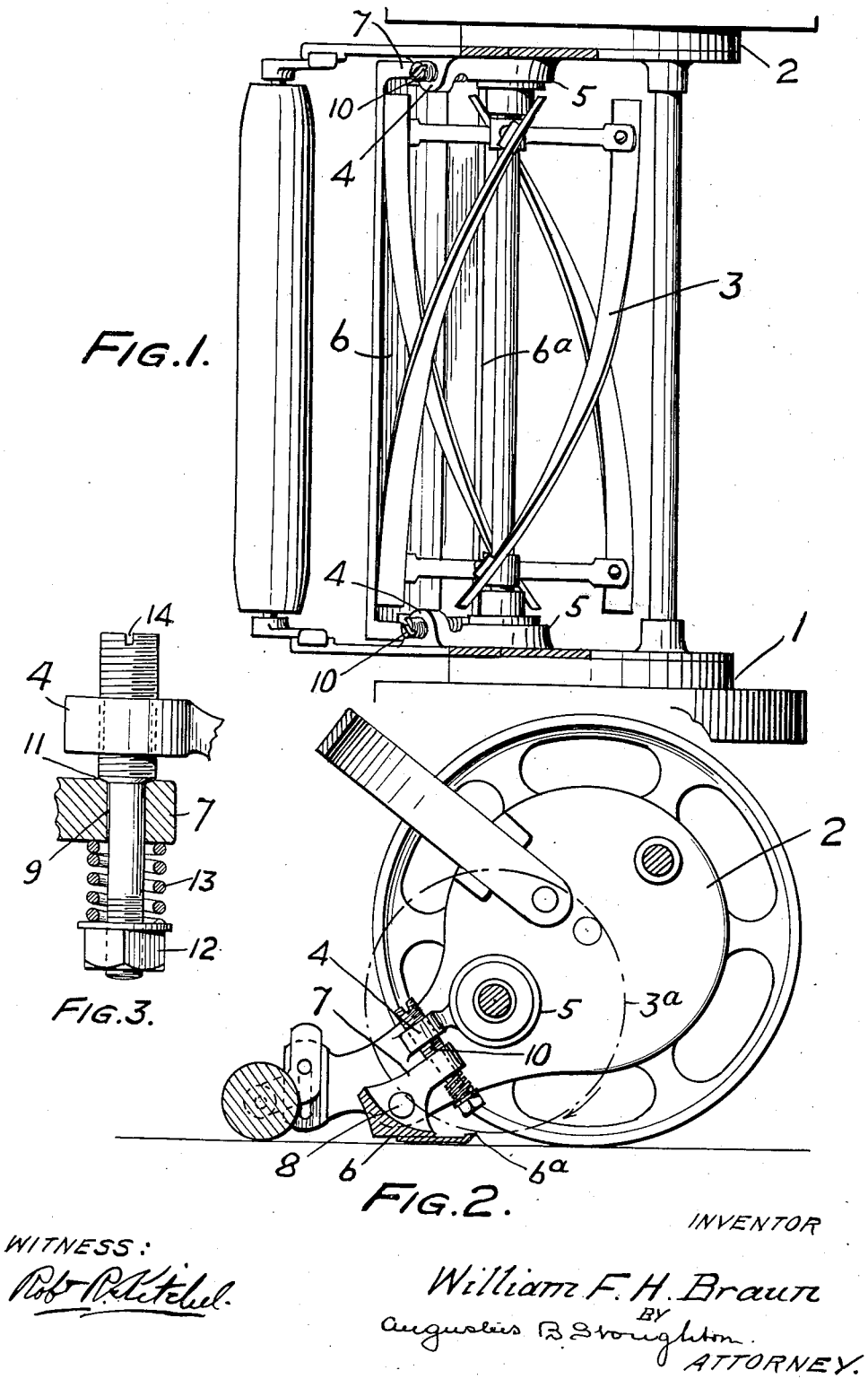

2,119,874

UNITED STATES PATENT OFFICE 2,119,874

LAWN MOWER

William F. H. Braun, Wynnewood, Pa., assignor to Pennsylvania Lawn Mower Works, Primos, Pa., a corporation of Pennsylvania Application September 2, 1937, Serial No. 162,084

2 Claims. (Cl. 56—294)

The principal object of the present invention is to provide means comprising comparatively few and simple parts capable of easy manufacture and assembly and adapted to support the cutting bar in respect to the rotary cutter and end frames of a lawn mower in such a way that the cutting bar can be adjusted in respect to the rotary cutter and held against further inward movement in respect thereto while the cutting bar is free to move away from the rotary cutter sufficiently to clear an obstruction which may get in between the rotary cutter and the cutting bar.

Other objects of the invention will appear from the following description at the end of which the invention will be claimed.

Generally stated the invention comprises a headed stud bolt provided intermediate of its ends with a stop shoulder and having one of its ends connected with the end frame of the mower and having a spring bearing upon its head, and a pivotal arm connected with the cutting bar and provided with an opening through which the stud bolt passes so that the arm is in engagement with both the shoulder and the spring.

The invention also comprises the improvements to be presently described and finally claimed.

In the following description reference will be made to the accompanying drawing forming part hereof and in which, Figure 1 is a top or plan view of portions of a lawn mower embodying features of the invention.

Figure 2 is a transverse sectional view of the same.

Figure 3 is a detail view partly in section and partly in elevation of mechanism embodying features of the invention.

Referring to the drawing, 1 and 2 are the end frames of the mower. In Figure 2 the dash and dot lines 3a indicate the path of revolution of the cutter. Since the construction at each of the end frames is identical it will be described but once. 4 is a threaded eye formed upon the inner face of the end frame and it is shown as provided through a boss 5 formed thereon. 6 indicates the cutter bar structure and 7 is an arm formed thereon and pivoted to the end frame at 8. The arm 7 is provided with an opening 9. 10 is a stud bolt mounted in a tapped opening in the eye 4 and it is provided with a shoulder 11 and a head 12. As shown the shoulder 11 is provided by making the stud bolt of two diameters and the head 12 is in the form of a nut. The stud bolt passes through the opening 9 with a comparatively loose fit. 13 is a spiral spring interposed between the nut 12 and the arm 7. The cutting edge 6a of the cutting bar can be adjusted toward and away from the path of the rotary cutter by suitably turning the stud bolt 10 in the threaded opening of the eye 4. For this purpose the stud bolt is shown as provided with a notch 14 for the reception of a screw driver or like tool. The tension of the spring 13 can be increased or diminished by adjusting the nut 12. Of course proper adjustment is made at each frame 1 and 2 of the machine. In use the shoulder 11 by engagement with the arms 7 fixes the position of the cutting edge 6a with respect to the path 3a of the rotary cutter in inward direction i. e., toward the axis of the rotary cutter. However, if an obstruction gets in between the rotary cutter and the cutting edge 6a or between parts connected therewith the cutting edge may by compression of the spring 13 move away from the path 3a of the rotary cutter and thus the parts are freed and cleared.

From the foregoing description it is evident that the described mechanism comprises very few parts which are easily made and assembled and which can be accurately and quickly adjusted.

It will be obvious to those skilled in the art to which the invention relates that modifications may be made in details of construction, arrangement and manipulation, without departing from the spirit of the invention which is not limited to such matters or otherwise than the prior art and the appended claims may require.

I claim:

1. For adjustably and yieldably supporting the cutter bar in respect to the rotary cutter and end frames of a lawn mower, the combination of, a pair of headed and shouldered bolts respectively having screwthread connection with the end frames, a pair of arms on the cutter bar respectively pivoted to the end frames and having openings in their free ends through which parts of the bolts loosely pass and springs respectively interposed between the heads of the bolts and the arms and pressing the latter into engagement with the shoulders.

2. For adjustably and yieldably supporting the cutter bar in respect to the rotary cutter and end frames of a lawn mower, the combination of, a pair of threaded eyes respectively fixed to the end frames, a pair of arms on the cutter bar and respectively pivoted at their intermediate portions to the end frames and provided at their free ends with openings, stud bolts of two diameters with a shoulder there-between and respectively having their parts of larger diameter screwed through the eyes with the shoulder in engagement with the arms to limit the movement of the bar toward the cutter and having their ends of smaller diameter passing loosely through the openings in the arms and equipped with nuts, and springs respectively mounted on the parts of the bolts of smaller diameter and interposed between the nuts and arms to permit the bar to move away from the rotary cutter.

WILLIAM F. H. BRAUN.